United States Patent [19]

DeBenedictis

[11] 4,213,158
[45] Jul. 15, 1980

[54] OPTICAL DATA RECORDING SYSTEM UTILIZING ACOUSTIC PULSE IMAGING TO MINIMIZE IMAGE BLUR

[75] Inventor: Leonard C. DeBenedictis, Los Angeles, Calif.

[73] Assignee: Xerox Corporation, Stamford, Conn.

[21] Appl. No.: 920,314

[22] Filed: Jun. 28, 1978

[51] Int. Cl.[2] .......................... G11B 7/00; H04N 5/76
[52] U.S. Cl. ........................... 358/296; 179/100.3 V; 346/108; 358/128.5; 358/285
[58] Field of Search ............... 358/199, 201, 206, 235, 358/296, 285, 302, 128; 365/106, 120, 127, 215, 234; 346/108; 179/100.3 G, 100.3 V

[56] References Cited

U.S. PATENT DOCUMENTS

| | | |
|---|---|---|
| 3,055,258 | 9/1962 | Hurvitz . |
| 3,514,534 | 5/1970 | Korpel ................................ 358/235 |
| 3,531,184 | 9/1970 | Adler . |
| 3,676,592 | 7/1972 | Foster ................................ 358/235 |
| 3,800,303 | 3/1974 | Picquendar et al. ................. 358/235 |
| 3,851,951 | 12/1974 | Eveleth ........................... 358/201 X |
| 4,130,898 | 12/1978 | Urbach et al. ....................... 365/215 |

OTHER PUBLICATIONS

Okolicsanyi, "The Wave-Slot, an Optical Television System," *The Wireless Engineer*, vol. 14, pp. 527–536, Oct. 1977.
Robinson, "The Supersonic Light Control and Its App. to TV w/Special Ref. & Scophony TV Receiver," *Proceedings of IRE*; pp. 483–486, Aug. 1939.
Korpel et al., "A TV Display Using Acoustic Deflection & Modulation of Coherent Light," *Applied Optics*, vol. 5, No. 10, pp. 1667–1675, Oct. 1966.
Chang, "Acoustooptic Devices and Applications, "*IEEE Transactions on Sonics and Ultrasonics*, vol. SU–23, No. 1, Jan. 1976, p. 14.

*Primary Examiner*—Robert S. Tupper
*Assistant Examiner*—Donald McElheny, Jr.
*Attorney, Agent, or Firm*—Irving Keschner

[57] ABSTRACT

An optical data recording system in which during recording the image of the acoustic pulse at the writing surface is made to move at the same relative velocity with respect to the recording medium whereby motion blur is minimized or reduced. The writing beam, such as that generated by a laser, is incident on acousto-optic device (such as a Bragg cell) and may be diffracted (deflected) at an angle determined by the frequency of a source applied to the device. By selecting the system magnification, in one embodiment, between the device and the recording medium such that the magnification is substantially equal to the ratio of the velocity of the recording medium, to the velocity of the sound wave in the acousto-optic device, the image of the acoustic pulse follows the surface of the recording medium and permits imaging of the video signal to the recording medium without blurring. In a second embodiment wherein the writing beam is scanned across the surface of the recording medium, the system magnification is selected to be substantially equal to the ratio of the velocity of the writing beam to the velocity of the sound wave in the acousto-optic device.

7 Claims, 11 Drawing Figures

OPTICAL DATA RECORDING SYSTEM UTILIZING ACOUSTIC PULSE IMAGING TO MINIMIZE IMAGE BLUR

BACKGROUND OF THE INVENTION

Acousto-optic modulators have been utilized in prior art optical recorders for recording information on recording mediums sensitive to laser flux as shown for example, in U.S. Pat. No. 3,922,485. In particular, this patent discloses a multifaceted polygon optical scanner which scans a modulated laser beam across a xeorgraphic medium. The beam may be modulated by an acousto-optic modulator which is driven by a system which has, an one input, video input information which is to be reproduced. A motion blur problem can arise in those forms of optical data recorders in which there is significant relative movement between the recording medium and the focused writing beam. Reduction of motion blur by the use of very fast electro-optic modulators is possible, but that technique tends to be rather costly. State-of-the-art acousto-optic modulators are not effective in many potential applications because of the practical limitations in the rise time of the modulator which is imposed by the transit time of the acoustic wave front across the laser beam, thereby reducing or severely limiting the response of the modulator to high speed input video information.

Korpel U.S. Pat. No. 3,514,534 discloses a laser modulating and scanning system which utilizes a pair of acousto-optic devices to modulate and deflect a laser beam across an image screen. By positioning the acoustooptic devices apart a predetermined distance, a visible replica of the video information to be reproduced is formed in a manner such that the picture elements are immobilized on the screen.

An article by D. M. Robinson, "The Supersonic Light Control and its Application To Television with Special Reference to the Scophony Television Receiver", proceedings of the I.R.E., vol. 27, pp. 483–486, August, 1939 discloses a system where a sound wave carries with it a replica of the video signal received during an immediately proceding time interval and which is projected on a screen, a mirror polygon being utilized to move the whole image across the screen at the same speed in the opposite direction to immobilize the details on the screen.

What is desired is to adapt the concept of providing a replica of the video signal carried by a sound wave to an optical recording system which utilizes rotating devices, such a a xerographic drum or an optical disc, as the reproduction medium and a simplified technique for immobilizing the image of the acoustic pulse at discrete areas at the writing surface to minimize image blur.

SUMMARY OF THE PRESENT INVENTION

The present invention provides a method for substantially reducing the bandwidth and rise time limitations associated with the use of state-of-the-art acousto-optic modulators in an optical data recording system by reimaging the motion of the acousto-optic pulse onto a recording medium thereby greatly increasing the effective bandwidth of the acoustooptic modulator and reducing any blurring of the image formed on the surface of the recording medium. In particular, the laser beam incident on the acousto-optic modulator may be diffracted, the diffracted beam being incident on the recording medium. By selecting the system magnification between the modulator and the recording medium to be substantially equal to the ratio of the surface velocity of the recording medium, in a first embodiment when the writing beam is fixed as it scans across the recording medium, to the velocity of the acoustic wave front in the acoustooptic modulator, the acoustic pulse (which essentially contains the video information) is reimaged onto the surface of the recording medium in a manner whereby the acoustic pulse follows the recording surface and permits an isomorphic mapping of the video signal to the recording medium without blurring. In a second embodiment wherein the writing beam is deflected in a scanning motion across the surface of the recording medium, the system magnification is selected to be substantially equal to the ratio of the velocity of the moving laser beam to the velocity of the sound wave in the acousto-optic modulator. In essence, the present invention utilizes the capability of an acoustooptic Bragg cell to modulate the spatial profile of an incident light beam (in addition to its well-known capability to modulate in time the power of the light beam) to minimize image blur by tracking the surface of the recording medium with a moving image of the video signal stream.

It is an object of the present invention to provide an improved optical data recording system.

It is an object of the invention to provide a scanning system which incorporates an acousto-optic modulator, the acousto-optic modulator being operated in a manner in which the bandwidth requirements of the modulator are substantially reduced.

It is a further object of the present invention to provide a technique for utilization of an acousto-optic modulator in a laser scanning system wherein the bandwidth requirements of the modulator are substantially reduced.

It is still a further object of the present invention to provide a pulse imaging technique for use in a laser beam writing system wherein the laser beam incident on the acousto-optic modulator interacts with the acoustic pulse, the laser output beam being projected onto a recording surface. Proper selection of the system magnification between the modulator and the recording surface provides a pulse image on the recording surface, the relative velocity of the pulse image with respect to the velocity at the recording surface being substantially zero thereby minimizing image blurring on the surface of the recording medium.

DESCRIPTION OF THE DRAWINGS

For a better understanding of the invention, as well as other objects and features thereof, reference is made to the following description which is to be read in conjunction with the accompanying drawings wherein.

DESCRIPTION OF THE PREFERRED EMBODIMENTS

Figure 1:
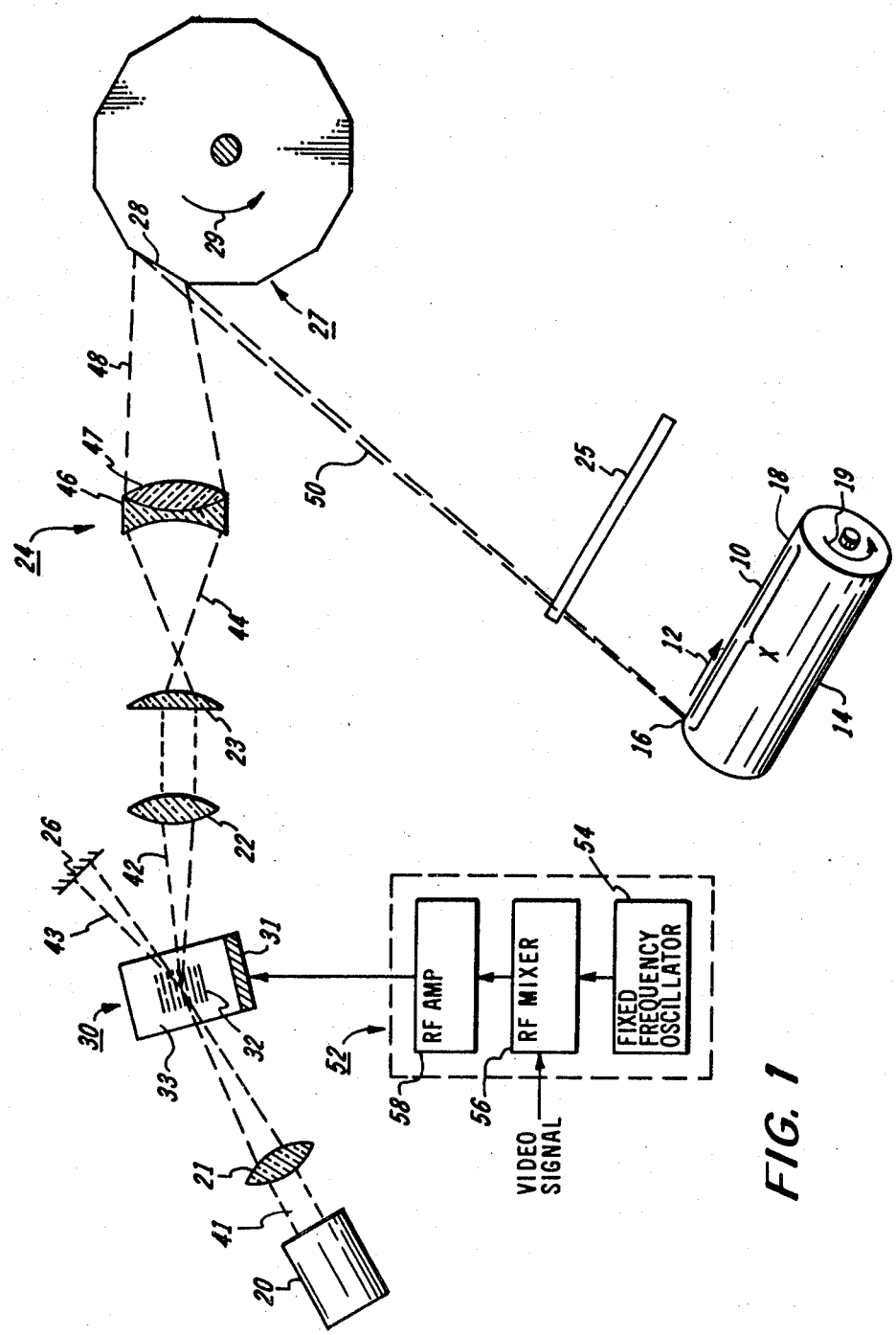
FIG. 1 is a partial schematic diagram of one embodiment of the optical scanning system of the present invention at the start of scan position.

Referring now to FIG. 1, a partial schematic diagram of one embodiment of the improved optical scanning system of the present invention at the start of scan position is illustrated. The optical portion of the schematic diagram shows the scanning system at the beginning of a scan line 10, the scan line 10 being in the direction of arrow 12 along the surface of a medium 14 which is sensitive to the laser flux utilized in the system. It is assumed that the scan line 10 starts at point 16 on the surface of medium 14, the scan line 10 being along a width x, i.e. from point 16 to point 18. As shown, medium 14 is preferably a xerographic drum which is rotated in the direction of arrow 19 to provide the Y direction of scan. It should be noted at this point that the recording medium may be an optical disc with the writing laser beam directly incident on the optical disc without the necessity of a scanning poloygon as will be described with reference to FIG. 5 hereinafter. A light source 20 provides the original light beam 41 for utilization by the scanning system. The light source 20 generates a collimated beam of light and preferably comprises a laser, such as a helium-cadmium or helium-neon laser. The laser which generates a collimated beam of monochromatic light may easily be modulated by an active optical element, acousto-optic modulator 30, in conformance with the information contained in a video signal applied to the modulator controller as will be set forth hereinafter. A lens 21 is provided to focus the beam 41 onto the modulator 30.

Figure 2:
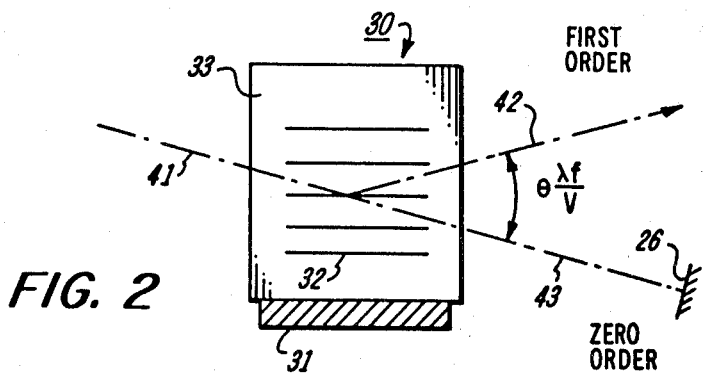
FIG. 2 is a schematic diagram of the active optical element used in the present invention.

FIG. 2 illustrates in schematic form the active optical element which may be used in the present invention. The element 30 is an acoustooptic Bragg cell or, as it is more commonly called, an acousto-optic modulator (hereinafter referred to as modulator). The modulator 30 comprises an electrically driven piezoelectric transducer 31, such as lithium nobate, bonded to an acousto-optic material 33 which may be glass, plastic, or crystal such as a single tellurium dioxide ($TeO_2$) crystal. The transducer 31 in response to an electrical drive signal generates an acoustic-wave which travels through the material, perturbing the index of refraction and acting as a phase grating 32, the grating period being equal to the drive or acoustic frequency. Grating density (ability of grating to modify the phase front of light beam) is proportional to the amplitude of the drive signal applied to the transducer 31. The wavefronts are segmented by the video signal characteristics, and for a video signal comprising a stream of "1"s and "0"s, it is assumed that the spacing between segmented wavefronts, is determined by the "0" time of the video signal although the "1" time can be utilized.

A beam of light 41 is applied to the modulator. Without a signal applied to the transducer 31, only a non-diffracted output beam 43 exists. Application of a signal to the transducer from a fixed frequency oscillator 54 produces two significant output beams, a first-order diffracted beam 42 and a zero-order non-diffracted beam 43. In the present invention, the first-order beam is the output, while the zero-order beam is absorbed by a beam stop 26 (the zero-order beam may be utilized as the output if desired). The intensity of the output beams is a function of the amplitude of the drive signal applied to the transducer.

An angle $\theta$ which represents the approximate angle of diffraction exists between the first-order and zero-order beams. The angle $\theta$ is directly proportional to the drive frequency f, the wave length of the incident laser light $\lambda$ and inversely proportional to the velocity of propagation V of the acoustic pulses in a modulator 30. An example of a modulator which may be used in the present invention is disclosed in U.S. Pat. No. 3,938,881.

With reference again to FIG. 1, the first-order beam 42 is positioned at the output of modulator 30 as shown, passes thorugh a recollimating lens 22, and is then incident on cylindrical lens 23 having power in the tangential (direction of scan) direction. Cylindrical lens 23 expands beam 42 into a beam 44 which is incident on optical element 24 which has a magnification level $M_1$ associated therewith. In the embodiment shown, optical element 24 comprises two elements, a biconcave element 46 and a second convex lens 47 cemented to biconcave lens element 46. Optical element 24 is configured to form an image of the acoustic pulses in modulator 30, as set forth hereinbelow, onto the surface of the recording medium 14. Although not shown, the magnification $M_1$ of optical element 24, which also may comprise a single lens element, is selected to be variable over a predetermined range in a manner known in the optical magnification art. The elements 23 and 24 and the distance therebetween are selected such that the beam portion 48 at the output of optical element 24 is directly incident onto a facet 28 of rotating multifaceted polygon 27 and thereafter focused via cylindrical lens 25 as scan line 10 proximate the surface of recording medium 14. Facet 28 may be fully illuminated along its width by the beam 48 as shown or the beam 48 can be compressed to a small spot on the facet 28.

The rotational axis of polygon 27 is orthogonal or nearly orthogonal to the plane in which light beams 42 travels. The facets of polygon 27 are mirrored surfaces for the reflection of any illuminating light impinging upon them. With the rotation of the polygon 27 in the direction shown by arrow 29, light beam 48 is reflected from illuminated facet 28 and translated through a scan angle for flying spot scanning.

The beam portion 50 reflected from facet 28 passes through cylindrical lens 25 which has power only in the sagittal direction (orthogonal to the direction of scan), beam portion 50 being focused at point 16 on surface of medium 14 as shown.

The acousto-optic modulator 30 is used to modulate the light beam 41 in accordance with the information contained in the electrical video signal supplied to the control circuit 52. In the control circuit a fixed frequency oscillator 54 provides an output of constant amplitude and constant frequency which is mixed with the electrical video signal in mixer 56. The output of the mixer 56 is amplified by amplifier 58 and then used as the drive signal to the transducer 31. The output beam of the modulator 30 may be either the zero-order beam or the first-order beam, the intensity of either beam being a function of the amplitude of the drive signal applied to the transducer 31.

Figure 3:
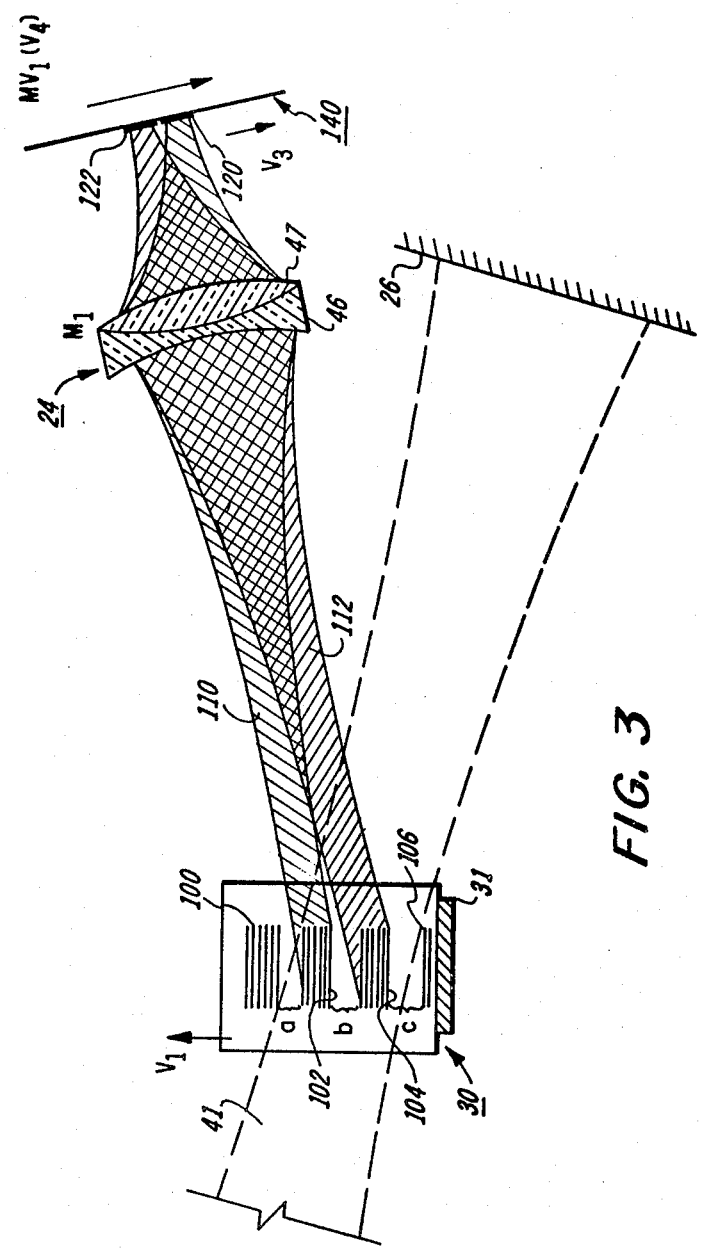
FIG. 3 shows in a simplified representation of the present invention wherein, in the case illustrated, two acoustic pulses are illuminated by an input laser beam and imaged onto an optical data recording surface.
Figure 4A:
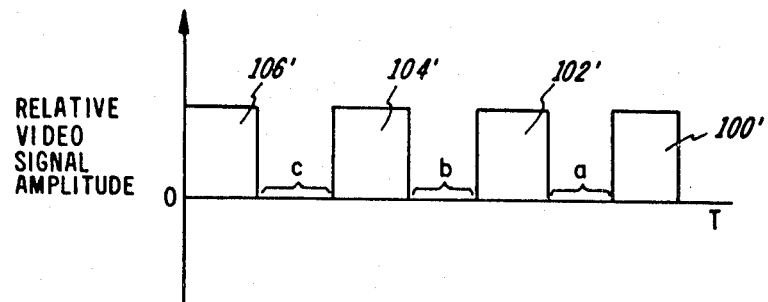
FIG. 4, including 4A–4C, illustrates the formation of transformed video pulses as optical pulses on the surface of a recording medium.

FIG. 3 is a simplified representation which sets forth the particular features of the present invention. In particular, the input laser beam 41 is focused onto Bragg cell 30 and the video information is impressed upon the r-f carrier which drives the travelling wave Bragg cell in a manner described hereinabove. As is well known in the art, acoustic pulses 100, 102, 104 and 106 . . . are set up in the modulator 30 corresponding to an acoustic volume phase grating, the spacing between the wavefronts being proportional to the input signal which may be a digitized scanned input, analog video signal or from a source of data, such as a computer. In the case of a binary signal the spacing between the wavefront a, b, c . . . is proportional to the duration of a "0" input signal as shown in FIG. 4(a) which may in turn correspond to the printing of no information on the laser sensitive medium. In effect, the video information (video pulses 100, 102 . . . corrrespond to the acoustic pulses 100, 102 . . . ) is transformed into coded segments of the acoustic volume phase grating produced by the data, or video, modulated RF carrier signal. Modulator 30 is oriented with respect to other system elements (such as folding mirrors which are not shown) so that the acoustic field travels in the proper direction with respect to the surface of the recording medium. In the case of the FIG. 1 embodiment, the acoustic field travels anti-parallel to the scan direction (or optical equivalent thereof). In other words, the acoustic field moves anti-parallel to the direction that the writing laser beam is caused to move relative to the recording medium. In the situation wherein an optical disc is utilized as the recording medium, the acoustic field travels in the same (parallel) direction as the velocity vector at the discrete area of the recording surface which is to be recorded on. Incoming video beam 41, in the case illustrated, has a sufficient width in the direction of sound propagation, indicated by the arrow labeled $V_1$, representing the sound wave velocity, to encompass two coded segments or "bits" (102 and 104) of the acoustic volume phase grating although more or less coded segments could be illuminated. The more coded segments illuminated, the better the resolution of the data recorded. Preferably, between one and two coded segments are illuminated. The coded segments 102 and 104 transform the incident laser beam 41 into separate optical beams 110 and 112, respectively, which move at the velocity of the phase grating within modulator 30. The optical element 24 is positioned relative to acousto-optic modulator 30 such that the deflected beams 110 and 112 are incident thereon and imaged as pulses 120 and 122, respectively, onto the surface of recording medium 140.

Figure 4B:
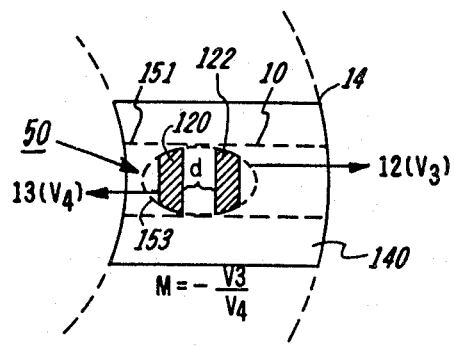
Figure 4C:
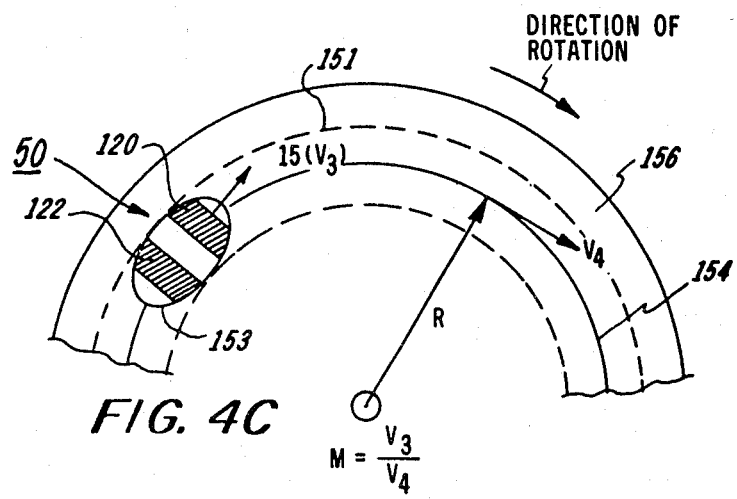

The element 140 shown in FIG. 3 represents the surface of a medium sensitive to laser flux incident thereon and may represent, for example, an optical disc or a xerographic member, such as xerographic drum. In the case of xerographic drum, the velocity of the recording medium 140 at the area wherein a scanning laser beam may be incident is essentially zero in the direction of scan (reference numeral 12 shown in FIG. 1). In the case wherein medium 140 is an optical disc, the velocity of the disc at the discrete area wherein the laser beam is incident (as will be described in more detail hereinafter) is substantially equal to the tangential velocity of the disc at that area. FIGS. 4(b) and 4(c) further illustrate the principles of the present invention. FIG. 4(b) shows in enlarged form a portion of the scanline 10 being formed on xerographic drum 14 and the beam 50 imaged thereon. The beam 50 at the surface 140 at the time when the acoustic wavefront interacts with the laser beam comprises coded optical pulses 120 and 122, the individual wavefronts in the modulator 30 not being resolved since the first order light is blurred to some extent. The spacing d between pulses 120 and 122 is proportional to the spacing between acoustic pulses 102 and 104 which in turn is equal to the product of the velocity of sound in the modulator 30 to the time interval of the marking video pulse. The width of the pulses 120 and 122 in the sagittal direction is determined by the shape of the laser beam interacting with the sheet of sound formed in the acousto-optic medium and the magnification of optical element 24 and lens elements 22, 23 and 25 in the sagittal direction. The width of the sound sheet 151, the laser beam shape, or envelope 153 and the acoustic pulses 120 and 122, as scaled by the magnification provided by the optical elements between modulator 30 and medium 10, is illustrated in FIG. 4(b). Since the beam 50 is caused to scan xerographic medium 10 in the direction of scanline 12 at a velocity $V_3$, the velocity of the drum in that direction being essentially zero, it is required that the pulses 120 and 122 move in the opposite direction (reference numeral 13) at a speed $V_4$ such that the image formed on the drum appears stationary, or immobilized, as the information is being printed on the drum in order to minimize image blur. In this regard, modulator 30 is oriented so that the image of the acoustic field (pulses) which is projected onto the surface of medium 14 travels in a direction 13 antiparallel to the scan motion introduced by the rotating polygon mirror 27. Although not illustrated, as the laser beam 50 continues to scan across the surface of xerographic drum 14, additional acoustic pulses will be imaged onto the surface of xerographicdrum 14 synchronized to the video information to be reproduced, an individual scanline thereby being formed. Additional scan lines are formed in accordance with video information to be reproduced using known scanning techniques.

It should be noted that FIG. 4(b) (and FIG. 4(c) to be described hereinbelow) illustrate the situation wherein the video pulse is of a relatively short duration (i.e. 10 nanoseconds) such that the optical pulses or segments 120 and 122 are formed within the envelope 153 of the laser beam. If the video pulse is of a longer duration such that the width of the corresponding optical pulse segment extends beyond the envelope 153, the acousto-optic pulse imaging system of the present invention still provides the desired results since the marking cycle, when completed, will provide the same exposure or mark due to the time of exposure which occurs.

Referring to FIG. 4(c), the same optical beam 50 is shown incident (in an enlarged form) on a discrete area of a particular track 154 of optical disc 156. The use of optical discs for recording information by utilizing a laser beam impinging thereon is known in the prior art. In this configuration, the velocity of the laser beam at the surface of the optical disc is essentially fixed at the time data is to be recorded since in optical disc recording technology, the laser is generally positioned to a desired track, the laser then being energized at the appropriate time as the optical disc rotates therepast. In this case, it is required that the velocity $V_4$ of the optical pulses 120 and 122 (in the direction of arrow 15) be equal to and in the same direction (reference numeral 17) as the velocity $V_4$ of the area of the track whereat information is to be recorded. In this case, the velocity of the discrete track area is essentially equal to the tangential velocity $V_4$ of the disc at that discrete area of the track.

In both configurations shown in FIGS. 4(b) and 4(c), the optical pulses 120 and 122 are shown at a particular instant of time, additional optical pulses being produced as the acoustic pulses are generated in medium 30.

Referring to FIG. 3, and assuming that the recording medium 140 is an optical disc, each of the coded segments 102 and 104 produce corresponding optical pulses 120 and 122, respectively, the separation between the acousto-optic pulse images corresponding to the separation between the segmented coded pulses 102 and 104. In essence, the light output from modulator 30 is broken up into spatial instead of temporal segments.

Acousto-optic interaction occuring in the region of acoustic pulses 102 and 104 cause the input light to be diffracted, the undiffracted or zero order light being absorbed, in the embodiment illustrated, by zero order stop member 26. The first order diffracted light is diffracted by the moving acoustic grating to optical element 24 which projects the optical beams 110 and 112 onto medium 140 as optical pulses 120 and 122, respectively.

According to one of the principles of the present invention, the recording medium selected is a xerographic medium as shown in FIG. 1 wherein the scanning direction is orthogonal to the direction of rotation of the drum. If the system magnification M between the acousto-optic modulator 30 and the surface of the photoreceptor is selected such that $-MV_1 = V_3$ wherein $V_1$ is the acoustic velocity in the medium 30, $V_3$ is the relative velocity of the laser scanning beam in the direction of scan (velocity effects in the direction of drum rotation are negligible) which can be measured, for example, by utilizing appropriate start and end of scan detectors, the image 120 and 122 of acoustic pulses 102 and 104, respectively, follows the velocity of the scanning beam in the opposite direction (relative velocity $MV_1$ of imaged acoustic pulses 120 and 122 with respect to the photoreceptor is substantially zero) and thereby permits an isomorphic mapping of the video signal to the surface of the recording medium with minimized blurring since the velocity of the medium in the direction of scan is substantially zero. The minus sign in front of the above relationship indicates that the optical elements between the acousto-optic modulator 30 and the surface of the recording medium should be selected such that the pulses are travelling, in the appropriate sequence, in a direction opposite to the scanning direction as exemplified in FIG. 4(b). It should be noted that in the actual system, each of the optical elements may contribute to system magnification other than optical element 24. The system of the present invention is designed so that the system optical magnification is of the proper value to make pulses 120 and 122 immobilized on the surface of the recording medium. A technique to ensure that the system optical magnification, after the system has been built, is of the proper value is to monitor the contrast ratio of the recorded images while adjusting lens magnification. To exemplify the above relationship, the acoustic compressional wave velocity $V_1$ may be calculated to be approximately $4.25 \times 10^5$ cm/sec for a $TeO_2$ acousto-optic modulator. For a scanning beam velocity of 2500 cm/sec, the system magnification between modulator 30 and the recording surface should be:

$$-M = \frac{V_3}{V_1} = \frac{2500 \text{ cm/sec}}{4.25 \times 10^5 \text{ cm/sec}} = \frac{1}{170.4}$$

Therefore, the velocity of the pulse images 120 and 122 at the recording medium surface is approximately 2500 cm/sec. It should be noted that it has been determined that the best performance of the system occurs when $V_3/V_1 = -M$ (or M for the case of the optic disc recording medium as described hereinbelow). However, it has been further determined that even if the magnification M can not be adjusted exactly to that ratio but is within around 10% of that value, the resolution characteristics of the optical data recording system will still be improved over the uncompensated system. This is particularly pertinent to the optical disc recording embodiment since the velocity $V_3$ utilized in the above equation is selected to correspond to the average velocity between the outermost and innermost recording tracks and one system magnification only may be provided.

Figure 5:
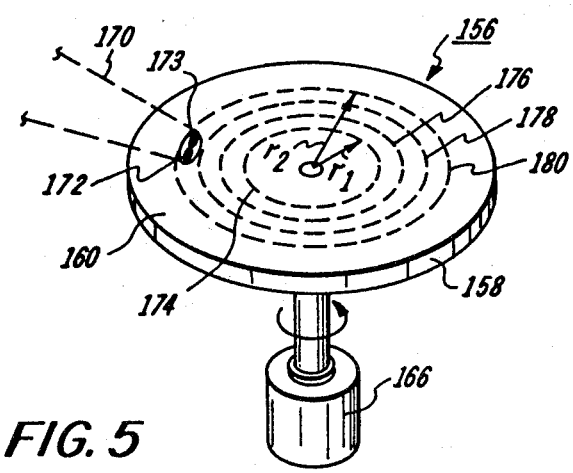
FIG. 5 shows in a simplified representation an optical disc which can be utilized as the recording medium.

A conventional optical memory device 156 may be utilized as the recording medium and as shown in FIG. 5 is comprised of a substrate disk 158 having on one surface thereof a storage or recording medium 160 in the form of a thin film, such as, for example, a film of bismuth on the order of 500 Å thick. During system operation, the optical memory is rotated at a constant speed by means of a drive motor. Modulated laser light beam 170, produced in a manner described hereinabove with reference to FIG. 3, produces a change in the optical characteristics of discrete, closely spaced portions 172 and 173 of recording medium 164 thereby providing a record of the information conveyed by the data signal supplied to modulator 30. Portions 172 and 173 are produced by the transformed video pulses 120 and 122 as described with reference to FIGS. 3 and 4 hereinabove.

It should be noted that the image velocity vector, which is a change of length in a unit time, can be increased or decreased linearly by the magnification factor M. Further, the magnification of an optical system can be different in the sagittal direction (direction orthogonal to direction of scan) and tangential direction (direction parallel to direction of scan). Since the blurring effect would be most apparent in the direction of scan, the magnification relationship set forth hereinabove is for the direction of scan.

As noted, a problem of motion blur can occur whenever writing a stream of high density data bits on a moving medium. In the case of optical data recording, such as recording on optical memory device 156, practically attainable rise and fall times of modulator 30 are often not short enough to produce the short pulses required to produce the desired hole (bit) size, thus causing significant loss of writing spot definition due to the movement of optical memory device 156 during the writing or recording of information, this relative movement causing blurring of the recorded data. Even if the required modulator was available, potentially serious growth of spot size can occur as a result of recording medium motion. Another disadvantage in being required to provide extremely short laser pulse widths (i.e. a short duty cycle, duty cycle being defined as the ratio of the laser pulse width to the repetition width) in order to minimize image blur as would be required in prior art systems would be that the amount of energy coupled to the disc surface would be reduced, resulting in the necessity of providing lasers having higher power capability which increases overall system cost. Further, the prior art systems utilizing continuous wave lasers would be inefficient since the laser beam is utilized for a small portion of the laser on time.

In accordance with the invention, motion blur is eliminated or minimized by the use of optical element 24 in the optical path between modulator 30 and the surface of recording medium 156 as described with reference to FIG. 1. The data is recorded on recording medium 156 in such a way that the image of the acoustic pulses 120 and 122 at track 174, for example, moves at approximately the same velocity as the recording medium area to be recorded on (track 174). After an appropriate time, the writing spot can be turned off by modulator 30 for the next "off" bit. Typical bit spacing may be on the order of 1 $\mu$m, and a typical bit size may be 0.5 $\mu$m to 1 $\mu$m. The optical disc may be recorded on by using ablationtype techniques or recording by changing the optical characteristics of the recording medium by means other than by ablation.

In particular, information is generally recorded on optical or video discs on concentric tracks 174, 176 . . . 180. The radial distance between the innermost track 174 (radius $r_1$) and the outermost track 180 (radius $r_2$) may be on the order of 2 inches. Since the tangential velocity of the optical disc at each track is proportional to the radius of the track from the track to the disc center, the magnification M is adjusted, in the preferred embodiment, to be equal to the ratio of the tangential velocity corresponding to a radius midway between the inner and outer radius $r_1$ and $r_2$ respectively and the velocity of the pulses in the acousto-optic medium 30. Thus, although the velocity term in the equation set forth hereinabove will not correspond exactly to the desired value, as the laser beam is positioned within the disc recording area the compensation provided is sufficient to minimize image blur. It should be noted, however, that means may be provided to automatically adjust the magnification of optical element 24 to equal the desired value as the laser beam is positioned within a disc recording area.

In accordance with the teachings of the present invention, it has been recognized that the video signal information which is required at the surface of the recording medium already exists within the acousto-optic modulator. In particular, the usual perception of an acousto-optic Bragg cell is that of a device which solely modulates in time the power of a light beam. The acousto-optic Bragg cell also modulates the spatial profile of the light beam. This latter capability minimizes image blur by tracking the moving recording surface with a moving image of the video signal stream. The spatial modulation is defined by the overlap of the light beam profile with the moving acoustic video signal stream (in essence, the packets of sound energy inside the modulator constitute a series of "windows" flowing past the light beam, successively exposing various segments of the laser light profile). This modulated light profile is then imaged onto the recording surface via appropriate optical elements so that the moving segments of light travel at the same speed as the disc surface, no blur occuring since there will be no movement of the light segment with respect to the disc surface. In order for tracking to occur, the requirements set forth hereinabove must be met. The acoustic video stream does not have the required dimensional scaling but in all other respects it is a faithful reproduction of the desired video image. The scaling is corrected by imaging the acoustic pulses onto the recording surface with the appropriate magnification provided by the optical elements interposed between the acousto-optic modulator and the surface of the recording medium.

Figure 6:
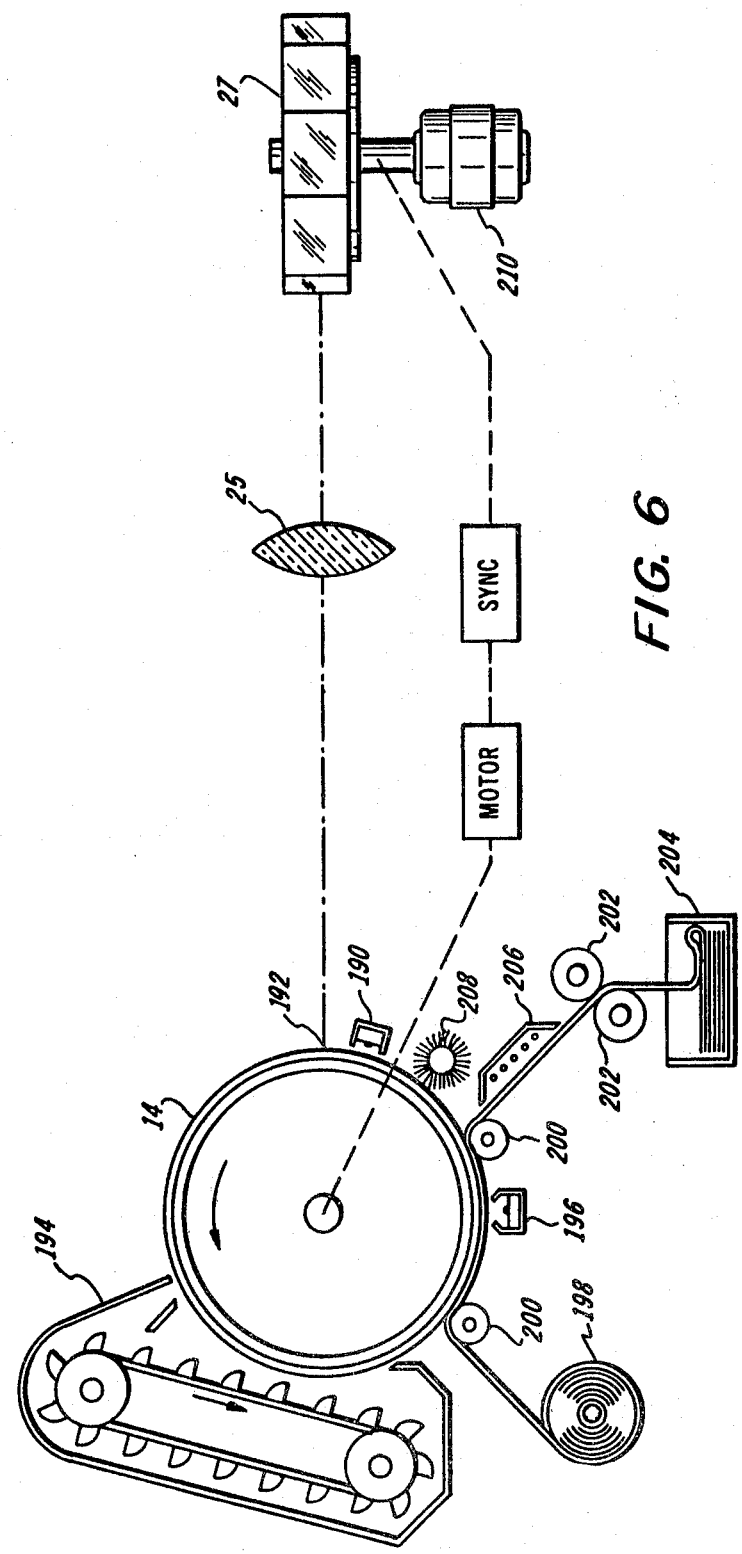
FIG. 6 shows a portion of the scanning system of the present invention shown in FIG. 1 being utilized to print information on a laser flux sensitive medium.

FIG. 6 shows, in more detail, the development of an image formed on a xerographic drum shown in FIG. 1. In particular, medium 10 may be a xerographic drum which rotates consecutively through a charging station depicted by corona discharge device 190, exposure station 192 where the beam from the rotating polygon 27 traverses the scan width x on the drum 14, through developing station 194 depicted by a cascade development enclosure, transfer station 196 where a web of copy paper is passed in contact with the drum 14 and receives an electrostatic discharge to induce a transfer of the developed image from the drum 14 to the copy paper. The copy paper is supplied from the supply reel 198, passes around guide rollers 200 and through drive rollers 202 into receiving bin 204. A fusing device 206 fixes the images to the copy paper as it passes to bin 204.

Usable images are provided in that the information content of the scanning spot is represented by the modulated or variant intensity of light respective to its position within the scan width x. As the spot traverses the charged surface 192 through a given scan angle, the spot dissipates the electrostatic charge in accordance with its light intensity. The electrostatic charge pattern thus produced is developed in the developing station 194 and then transferred to the final copy paper. The xerographic drum 14 is cleaned by some cleaning device such as a rotating brush 208 before being recharged by charging device 190. The polygon 27 is continuously driven by motor 210 and synchronized in rotation to a synchronization signal representative of the scan rate used to obtain the original video signal. The rotation rate of the xerographic drum 14 determines the spacing of the scan lines. It also may be preferable to synchronize the drum 14 in some manner to the signal source to maintain image linearity.

Another significant advantage of utilizing pulse imaging scanning over prior art scanners concerns appropriate illumination of the limiting aperture to achieve maximum resolution. The limiting aperture in the embodiment of FIG. 1 is the polygon facet 28. The limiting aperture in the embodiment of FIG. 5 is an imaging element (not shown). Standard scanner design theory teaches that resolution performance is governed by the convolution of the video signal stream with "impulse response" of the scanner. This "impulse response" is the spatial intensity profile of the scan spot (16 in FIG. 1). Optimum resolution occurs when this spot is most compact. The scan spot will be most compact when the limiting aperture (facet 28 in FIG. 1) is uniformly illuminated.

Because the laser beam profile is not uniform, but typically Gaussian, the uniform illumination of the limiting aperture can only be approximated by overfilling the limiting aperture with laser light as shown, for example, in the aforementioned U.S. Pat. No. 3,922,485. However, only a fraction of the light energy, typically less than 50%, falls within the limiting aperture of the scanner optics. Therefore, the light throughput efficiency of the scanner cannot be better than 50%.

In contradistinction thereto, the pulse imaging scanner of the present invention exhibits its best resolution performance when the light beam incident upon the limiting aperture subtends only a fraction of this aperture i.e. an underfilled condition. This configuration has inherently high light capture at the limiting aperture, and hence significantly greater light throughput efficiency. In particular, resolution does not degrade because of FM blur wherein the light intensity profile grows in width with more rapid video signal fluxtuations.

Because of FM blur, the limiting aperture can be underfilled for quiescent video signals, and filled for rapidly varying video signals. This allows a far more favorable tradeoff between light capture and resolution. In particular, the resolution performance of the pulse imaging scanner is governed by the relative dimensional scaling between the quiescent (steady state video signal applied to the modulator) light profile and the limiting aperture. If the quiescent light severely overfills the aperture (a low light throughput efficiency configuration), then the resolution performance will be equal to the prior art scanners. In the opposite extreme, when the quiescent light profile subtends a small fraction of the aperture, then resolution performance is increased greatly. Therefore, the pulse imaging scanner provides a range of video signal operating frequencies wherein resolution is greatly improved over the prior art scanners and wherein its performance is at least equal to the prior art scanners at higher operating ranges.

Figure 7:
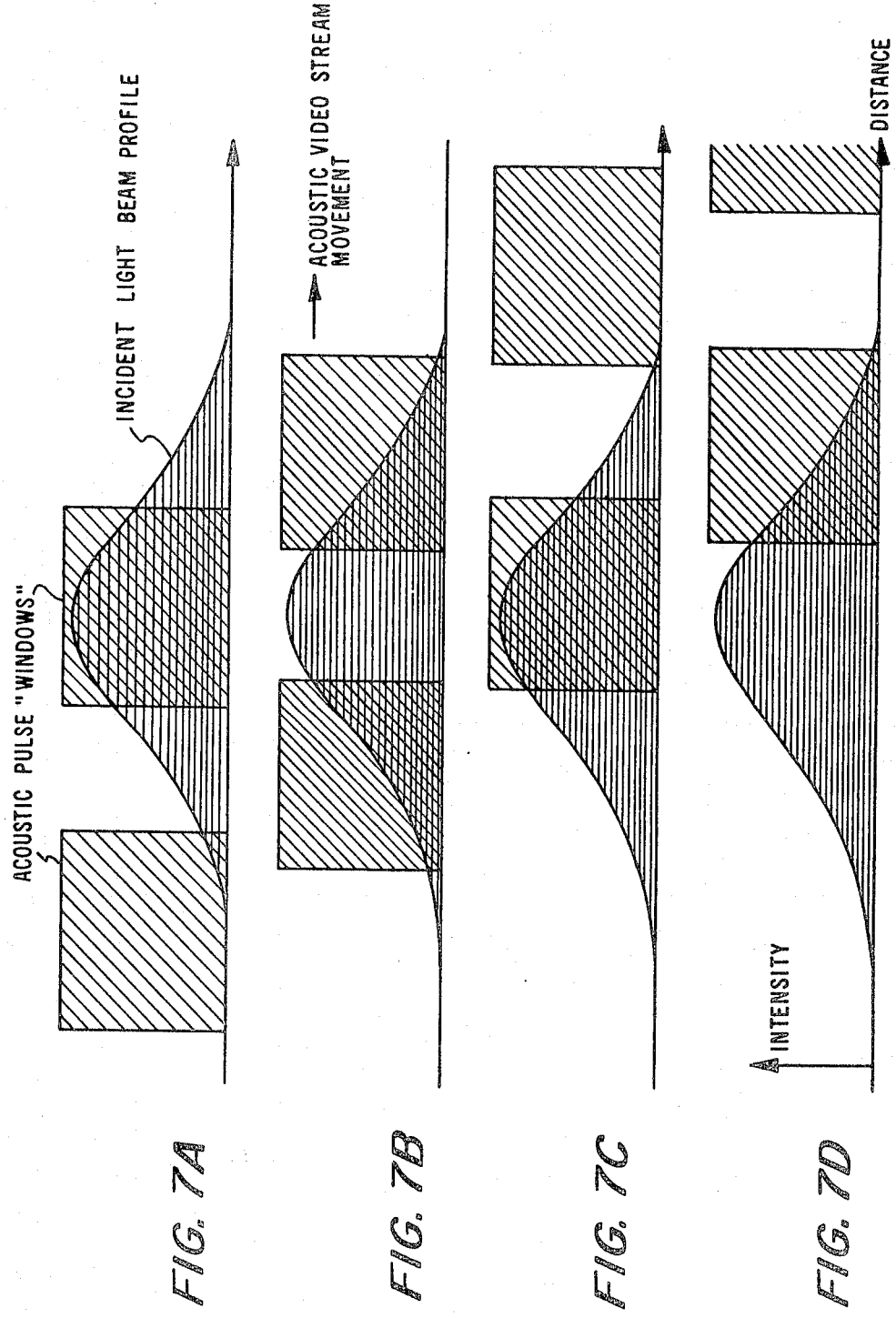
FIGS. 7-11 illustrate in a more visual form the principles of the present invention.
Figure 8:
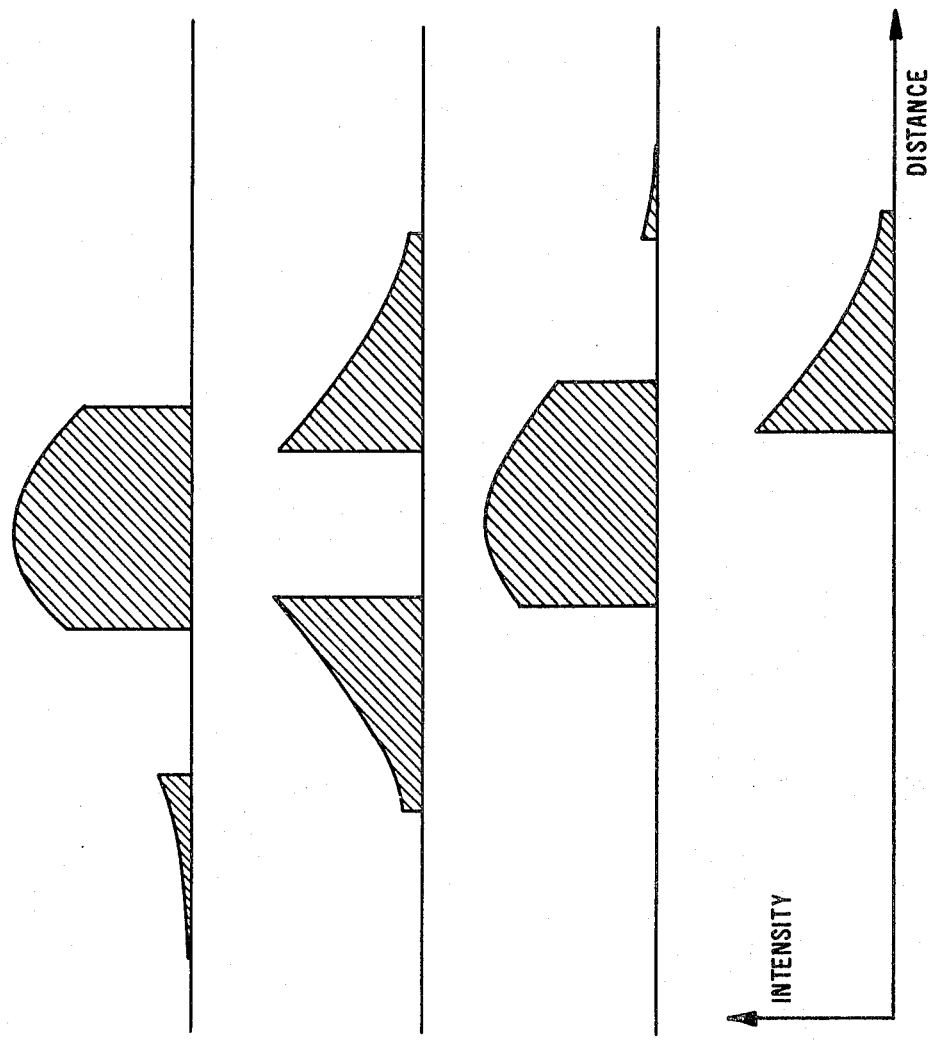
Figure 9:
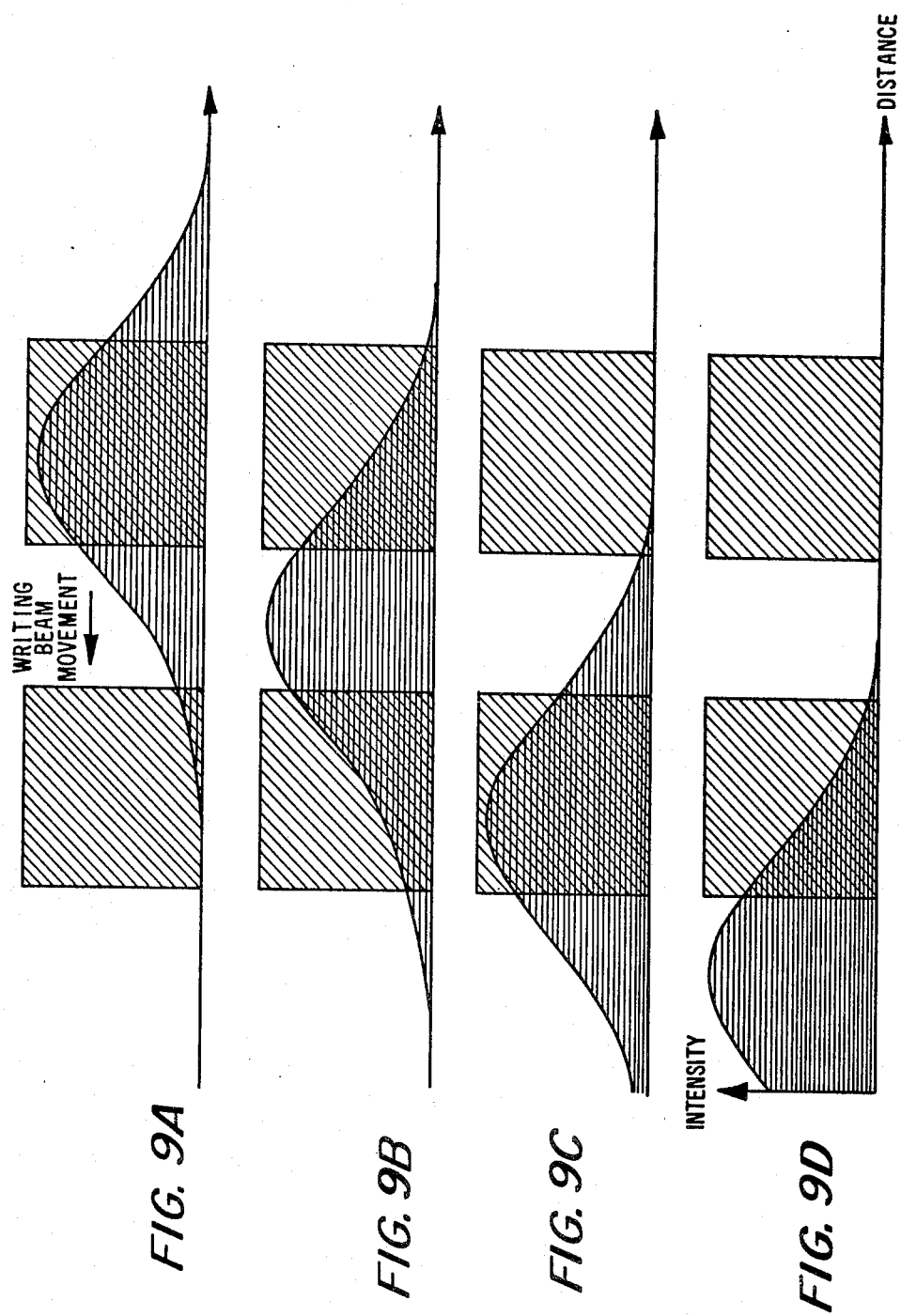
Figure 10:
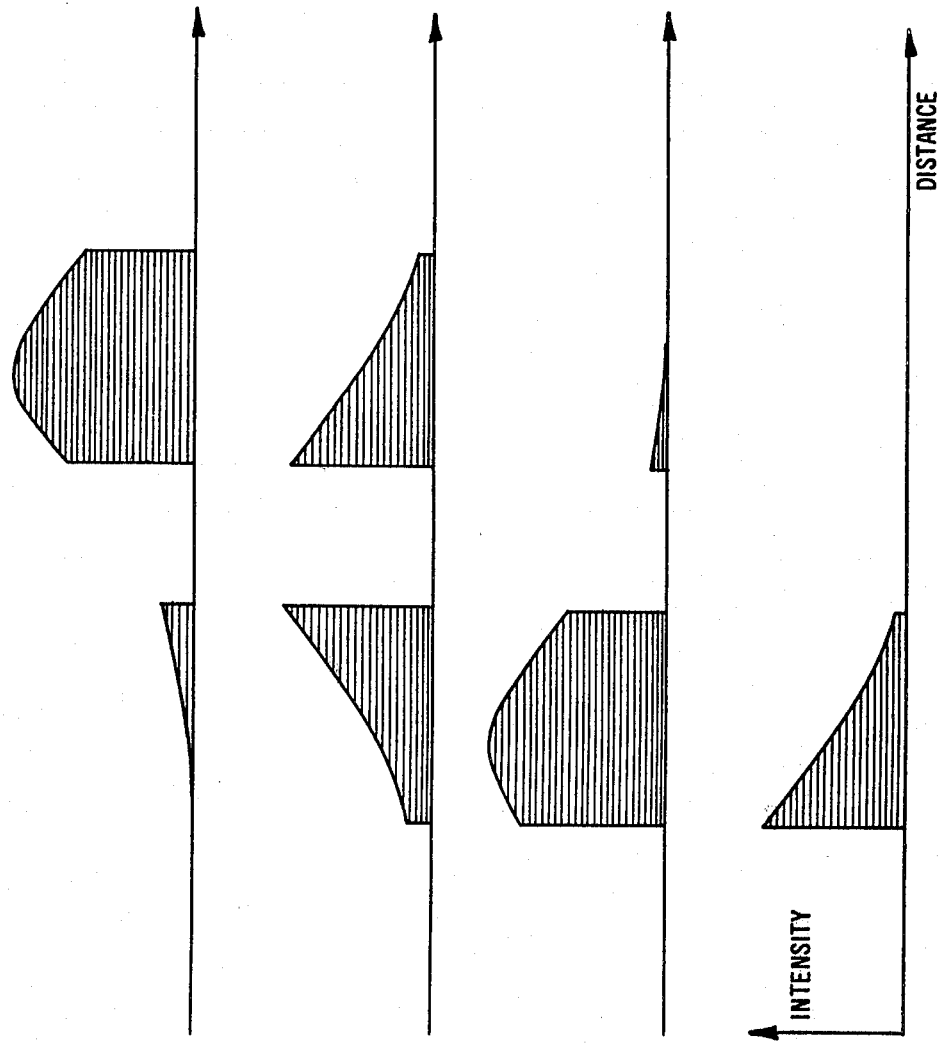
Figure 11:
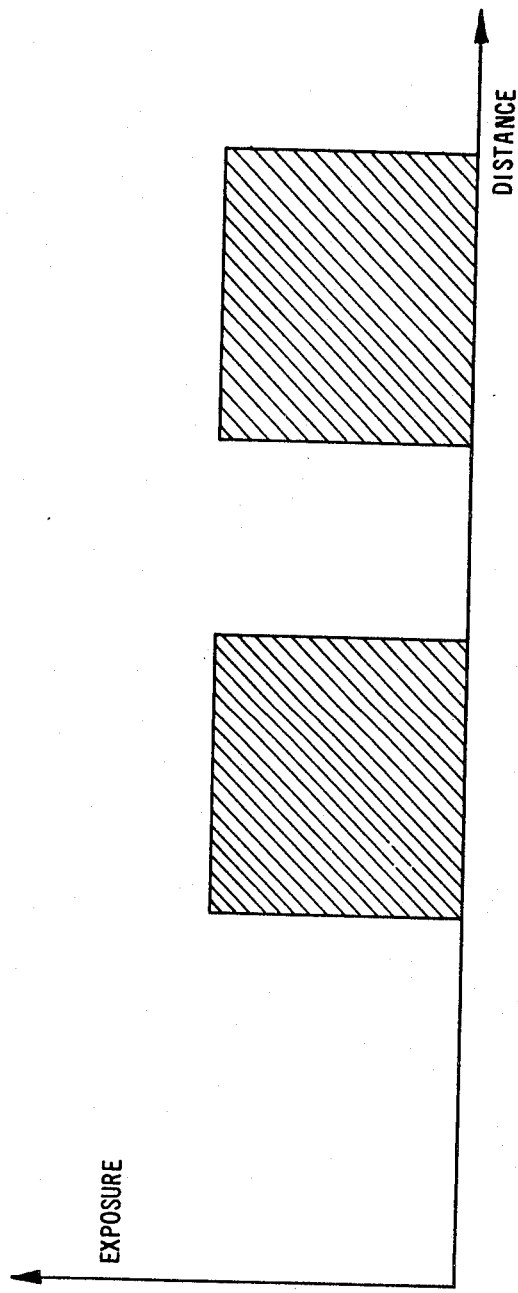

In order to more clearly visualize the pulse imaging concept of the present invention, reference is made to FIGS. 7-11 (for the purpose of this illustration, the optical disc is utilized as the recording medium). FIG. 7 illustrates the overlap (shaded area) of the incident laser beam and the acoustic video stream in successive time frames a,b,c, and d as would be seen by an observer located at modulator 30. FIG. 8 illustrates, in the same successive time frame, the spatial profile of the modulated light beam as seen by an observer located at modulator 30. FIGS. 9 and 10 illustrate the writing beam profile in successive time frames as seen by an observer located on the surface of an optical disc, FIG. 9 also illustrating how the writing beam movement tracks the optical disc motion. FIG. 11 illustrates the resulting (composite) idealized exposure profile formed at discrete areas on the surface of the optical disc.

While the invention has been described with reference to its preferred embodiments, it will be understood by those skilled in the art that various changes may be made and equivalents may be substituted for elements thereof without departing from the true spirit and scope of the present invention.

What is claimed is:

1. An optical data recording system for recording information on a light sensitive member comprising:
    means for providing a beam of radiant energy;
    a Bragg diffraction light-sound interaction medium including a transducer coupled to an acoustic wave transmitting medium characterized by a predetermined acoustic wave propagation velocity,
    scanning means having at least one reflective surface positioned in the optical path of said beam for scanning said beam across said member by rotating said reflective surface a desired angle to impart the information content of said beam to said member;
    a video modulating signal source coupled to said transducer for propagating intensity-modulated acoustic waves in said medium at a predetermined velocity,
    means for projecting through said medium in a direction transverse to said acoustic waves said light beam to produce in said medium a moving image of information corresponding to said modulating signal, said image moving at said predetermined velocity; and
    optical means interposed in the path of said intensity modulated beam and having magnification M associated therewith, said moving image being projected onto said scanned member within the envelope of said beam in a manner such that the velocity of said moving image is substantially equal to and in an opposite direction as the velocity of said scanning beam, the direction of movement of said beam and said image being substantially orthogonal to the direction of rotation of said medium.

2. The optical data recorder as defined in claim 1 wherein said medium comprises a rotating xerographic member and said scanning means comprises a rotating polygon for scanning said moving image and beam across said medium in a direction orthogonal to the direction of rotation of said medium.

3. The optical data recorder as defined in claim 1 wherein the magnification M is selected such that M is substantially equal to $V_3/V_1$ wherein M is the system magnification between the interaction medium and said member, $V_3$ is the velocity of said scanned light beam and $V_1$ is said predetermined velocity.

4. The optical data recorder as defined in claim 3 wherein the magnification M is the magnification in a direction parallel to the direction of scan.

5. An optical data recorder system for recording information on a light sensitive member comprising:
    means for providing a beam of radiant energy;
    a Bragg diffraction light-sound interaction medium including a transducer coupled to an acoustic wave transmitting medium characterized by a predetermined acoustic wave propagation velocity;
    means for projecting through said medium in a direction transverse to said acoustic waves said light beam to produce in said medium a moving image of information corresponding to said modulating signal, said image moving at said predetermined velocity; and
    optical means interposed in the path of said intensity modulated beam and having magnification M associated therewith, said moving image being projected onto discrete areas of said member within the envelope of said beam in a manner such that the velocity of said moving image is substantially equal to and in the same direction as the tangential component of motion of said discrete areas of said member.

6. The optical recording system as defined in claim 5 wherein said member comprises a rotating optical disc.

7. The optical recording system as defined in claim 6 wherein the magnification M is selected such that M is substantially equal to $V_3/V_1$ wherein M is the system magnification between the medium and said rotating member, $V_3$ is said tangential velocity and $V_1$ is said prdetermined velocity.

* * * * *